Dec. 11, 1962 W. H. HAUPT 3,068,357

X-RAY APPARATUS

Original Filed Aug. 6, 1953 8 Sheets-Sheet 1

INVENTOR.
WALTER H. HAUPT
BY Joseph Weingarten
ATTORNEYS

Dec. 11, 1962 W. H. HAUPT 3,068,357

X-RAY APPARATUS

Original Filed Aug. 6, 1953 8 Sheets-Sheet 2

*INVENTOR.*

WALTER H. HAUPT

*BY* Joseph Weingarten

ATTORNEYS

Dec. 11, 1962 W. H. HAUPT 3,068,357

X-RAY APPARATUS

Original Filed Aug. 6, 1953 8 Sheets-Sheet 3

INVENTOR.
WALTER H. HAUPT
BY
Joseph Weingarten
ATTORNEYS

Dec. 11, 1962

W. H. HAUPT 3,068,357

X-RAY APPARATUS

Original Filed Aug. 6, 1953

8 Sheets-Sheet 4

INVENTOR.

WALTER H. HAUPT

BY

Joseph Weingarten

ATTORNEYS

Dec. 11, 1962 W. H. HAUPT 3,068,357

X-RAY APPARATUS

Original Filed Aug. 6, 1953 8 Sheets-Sheet 5

INVENTOR.
WALTER H. HAUPT
BY
Joseph Weingarten
ATTORNEYS

Dec. 11, 1962 W. H. HAUPT 3,068,357

X-RAY APPARATUS

Original Filed Aug. 6, 1953 8 Sheets-Sheet 6

INVENTOR.
WALTER H. HAUPT

BY Joseph Weingarten
ATTORNEYS

INVENTOR.
WALTER H. HAUPT
BY Joseph Weingarten
ATTORNEYS

Dec. 11, 1962 W. H. HAUPT 3,068,357

X-RAY APPARATUS

Original Filed Aug. 6, 1953 8 Sheets-Sheet 8

INVENTOR.
WALTER H. HAUPT

BY Joseph Weingarten

ATTORNEYS 3,068,357

X-RAY APPARATUS

Walter H. Haupt, Covington, Ky., assignor to Keleket X-Ray Corporation, Waltham, Mass., a corporation of Ohio

Original application Aug. 6, 1953, Ser. No. 372,718, now Patent No. 2,854,302, dated Sept. 23, 1958. Divided and this application July 23, 1958, Ser. No. 750,487

5 Claims. (Cl. 250—57)

This invention relates to X-ray tables, and more particularly to tilting X-ray tables. The present application is a divison of my co-pending application Serial No. 372,718, filed August 6, 1953, entitled Double Tilt X-Ray Table, now Patent No. 2,854,302.

One of the primary objects of the invention is to provide a tilting X-ray table of improved and simplified construction which is capable of tilting in either direction from the horizontal up to a fully vertical position, utilizing different pivots depending upon the direction of tilting from the horizontal, and more particularly to provide such a table which is supported entirely at the back thereof to leave the front free for ready access by the operator and which employs a simple reversible jack member as the main driving unit for the tilting movement thereof.

Another major object of the present invention is to provide a tilting X-ray table which includes a tower and tube carriage mounted for movement both laterallly and longitudinally of the table in which the counterweight for the tunnel or fluorescent screen on the tower is also a part of the counterweight for the tower and tube carriage in tilted positions of the table and in which the connections between the tunnel support and its counterweight is constructed and arranged to permit a full range of movements of the tower and tube carriage laterally of the table without movement of any of the counterweights.

A further object is to provide a tilting X-ray table having maximum provisions for safety in operation including limit switches controlling the movements of the table and positively acting locks for retaining both the table and associated appliances therefor in desired operating positions.

An additional object of the invention is to provide a tilting X-ray table having an improved and simplified supporting mechanism for the X-ray tube cables within the table which is constructed and arranged to permit a full range of movements of the tube head laterally and longitudinally of the table with a minimum amount of cable, and especially with minimum requirements of exposed cable below the table.

It is also an object of the invention to provide a two-way tilting X-ray table having a selective control system such that all tilting movements of the table are readily controlled as to angle, direction and speed of movement from a single control station.

Many additional objects and advantages of the invention will be apparent from the following description, the accompanying drawings and the appended claims.

In the drawings—

Figures 10, 11:
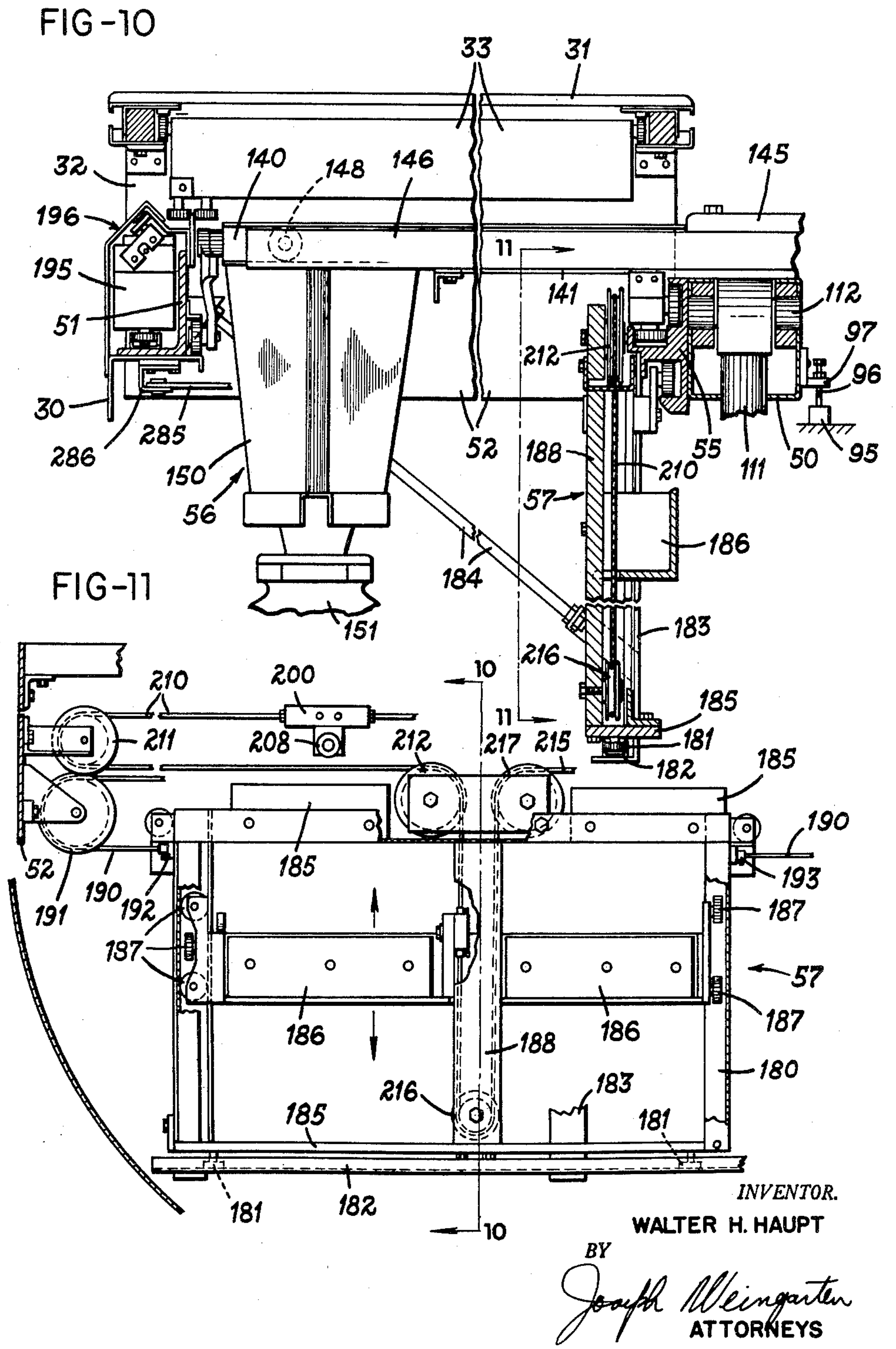
FIG. 10 is a vertical sectional view through the center of the table and counterweight as indicated by the line 10—10 of FIG. 11 and also showing portions of the tower and tube carriage in elevation.
FIG. 11 is a fragmentary view looking in the direction indicated by the line 11—11 in FIG. 10.

Referring to the drawings, which illustrate a preferred embodiment of the invention, the main shell of the table is indicated at 30, and it includes a top 31, a slot 32 for handles of the bucky 33 (FIG. 10) and a bottom pan 34. The tower 35 at the back of the table is shown as supporting a tunnel indicated generally at 36, and since the tower could alternatively carry a fluorescent screen or other appliance, the term "tunnel" is used herein as including a fluorescent screen or other such device. The base for the table includes a main base plate 40 extending beneath the table and two vertical plates at the back of the table, an outer plate 41 and an inner plate 42 which is provided with welded braces 43. An additional base plate 44 extends across the center of base plate 40 and supports the main drive mechanism for the table.

The main structural member of the table frame is a beam 50 which extends the full length of the table at the back thereof and is shown as a hollow section for high strength and rigidity without excessive weight. An angle 51 extends similarly along the front of the table, and the parts 50 and 51 are connected by end plates 52. The beam 50 also carries a track member 55 at the back of the table for the tower and tube carriage identified generally as 56 as well as the carriage 57 supporting the counterweights for carriage 56 and for the tunnel 36.

The table is provided with two separate toggle linkages which form the pivots for tilting to the left or right respectively from its horizontal reference position. The left pivot linkage includes a pin 60 set in beam 50 and extending rearwardly therefrom a sufficient distance to be received at its rearward end at an open socket 61 in the outer vertical plate 41. An arm 62 has a T-shaped end rotatable on pin 60 by means of bearings 63, and its other end is pivoted by a pin 64 to a pair of arms 65 having their outer ends pivoted at 66 in bosses 67 on plates 41 and 42, the arms 65 being on opposite sides of plate 42. The right hand pivot linkage is identical and includes a pin 70 set in beam 50 and received in socket 71 in plate 41. The arm 72 has its T-shaped end rotatable on pin 70, and its other end is pivoted by a pin 74 to a pair of arms 75 having their other ends pivoted at 76 in bosses 77 on plates 41 and 42.

Figures 3, 4, 5:
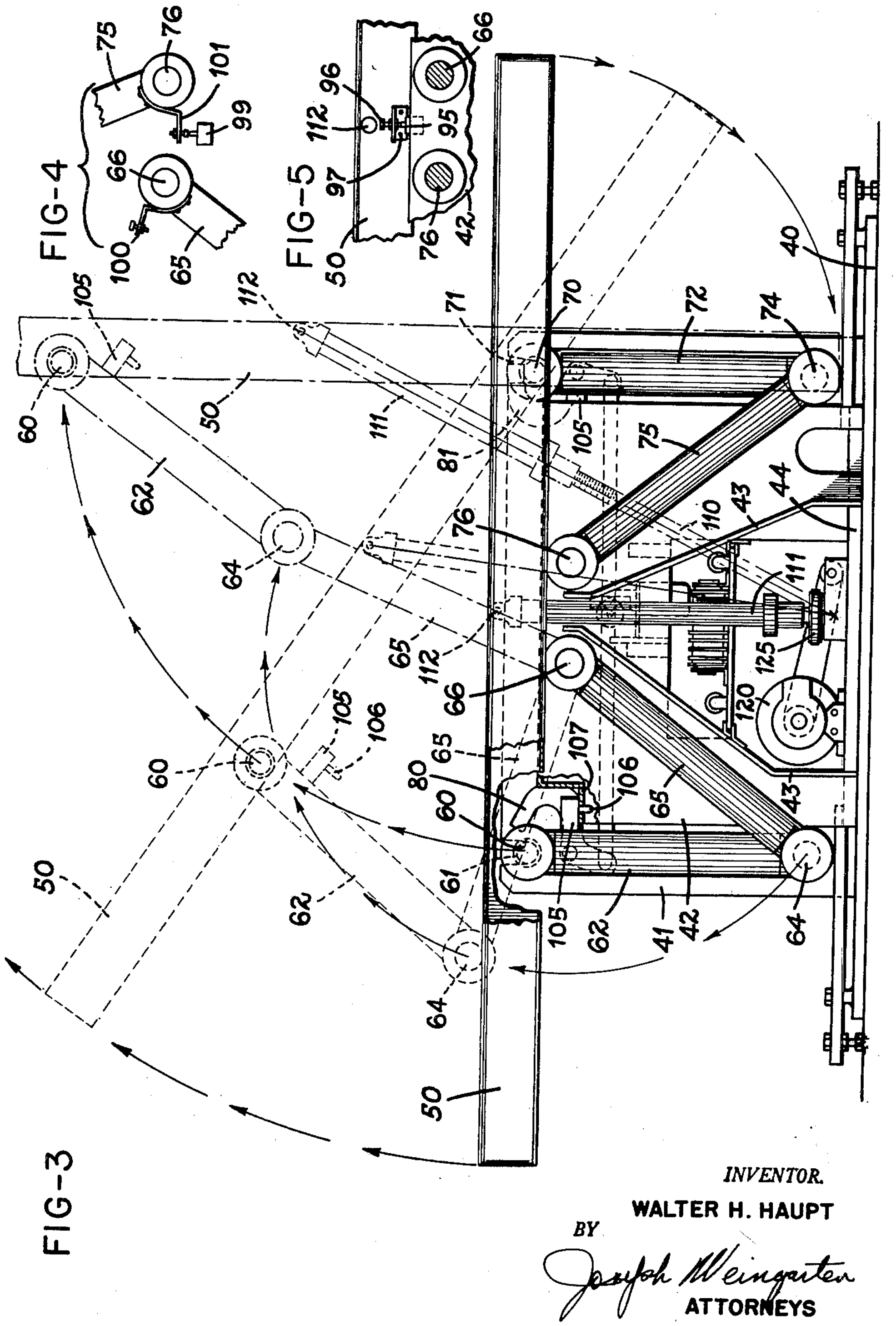
FIG. 3 is a somewhat diagrammatic view of the table in front elevation illustrating its tilting movements.
FIGS. 4 and 5 are fragmentary views illustrating the location and operation of two of the limit switches for the table.
Figure 6:
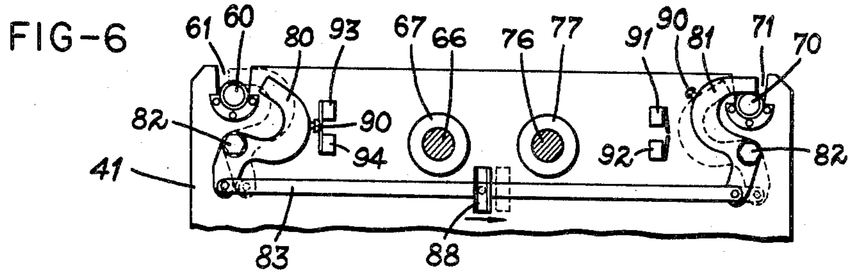
FIG. 6 is a fragmentary view on the line 6—6 of FIG. 7 showing the mechanism for selectively locking the pivots for the table.
Figure 7:
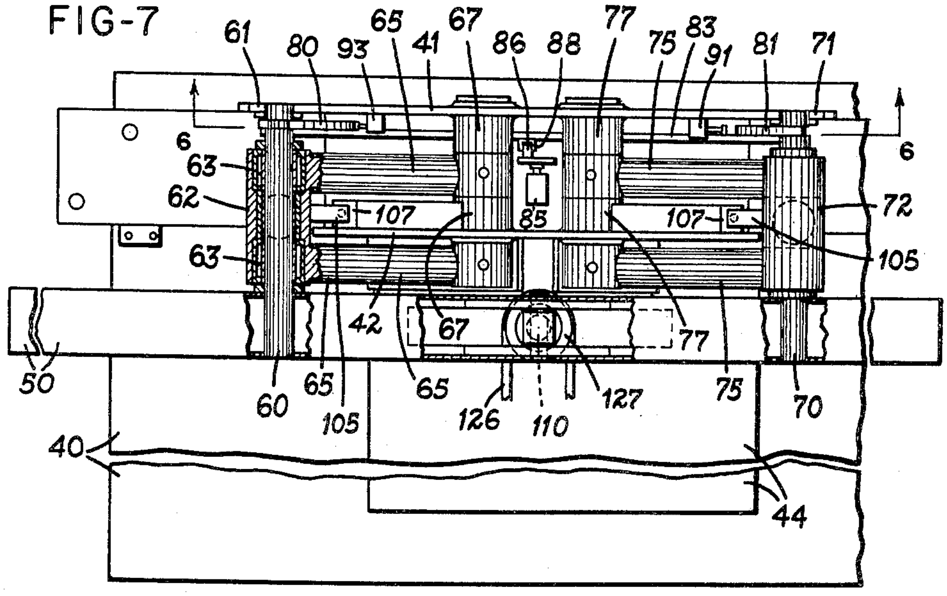
FIG. 7 is a fragmentary plan view looking downwards in FIG. 3 and partly broken away.
Figure 8:
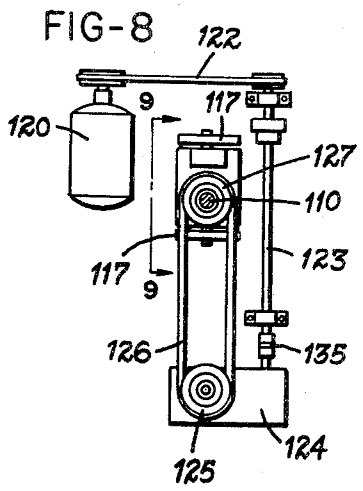
FIG. 8 is a fragmentary and somewhat diagrammatic view looking downwardly on the main drive for the table.
Figure 9:
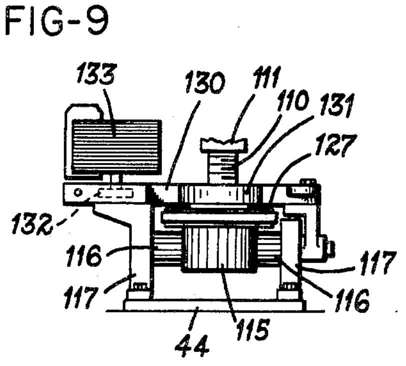
FIG. 9 is a fragmentary view looking in the direction indicated by the line 9—9 of FIG. 8.

When the table pivots about the axis of either of pins 60 or 70, the other pivot linkage rises as shown in FIG. 3, and means are provided for selectively locking either pin 60 or 70 in its associated socket 61 or 71 in accordance with the disclosure in which it is desired to tilt the table from the horizontal. This locking means includes a pair of hooks 80 and 81 each pivoted at 82 to the back plate 41 and arranged to latch over its associated pins 60 or 70 when the pin is in its socket. These hooks are operated alternately by a bar 83 pivoted to the lower ends of both hooks for shifting movement lengthwise of the table. Shifting of bar 83 is effected by a small electrical motor 85 mounted between plates 41 and 42 and driving a cam 86 of suitable shape engaging a short section of channel 88 secured to bar 83.

FIGS. 3–6 also show the location and operating means for several of the limit switches which control the movements of the table as described hereinafter in connection with the wiring diagram. Each of the hooks 80 and 81 carries a pin 90 adapted to operate a pair of limit switches mounted on plate 41, the pairs of switches 91 and 92 being operated by hook 81 when hook 80 is fully latched to cause the table to tilt to the left from the horizontal, and the pair of switches 93 and 94 being operated by hook 80 when hook 81 is fully locked to cause tilting of the table to the right. Another limit switch 95 is mounted on plate 42 and is operated by a pin 96 carried by a bracket 97 on beam 50 to stop the table in horizontal position when returning from either titled position, and the limit switch 99 which terminates tilting movement of the table in either vertical position is mounted on plate 41 for operation by one or the other of the fingers 100 and 101 on the hubs of the rearward arms 65 and 75 respectively.

Figures 1, 2:
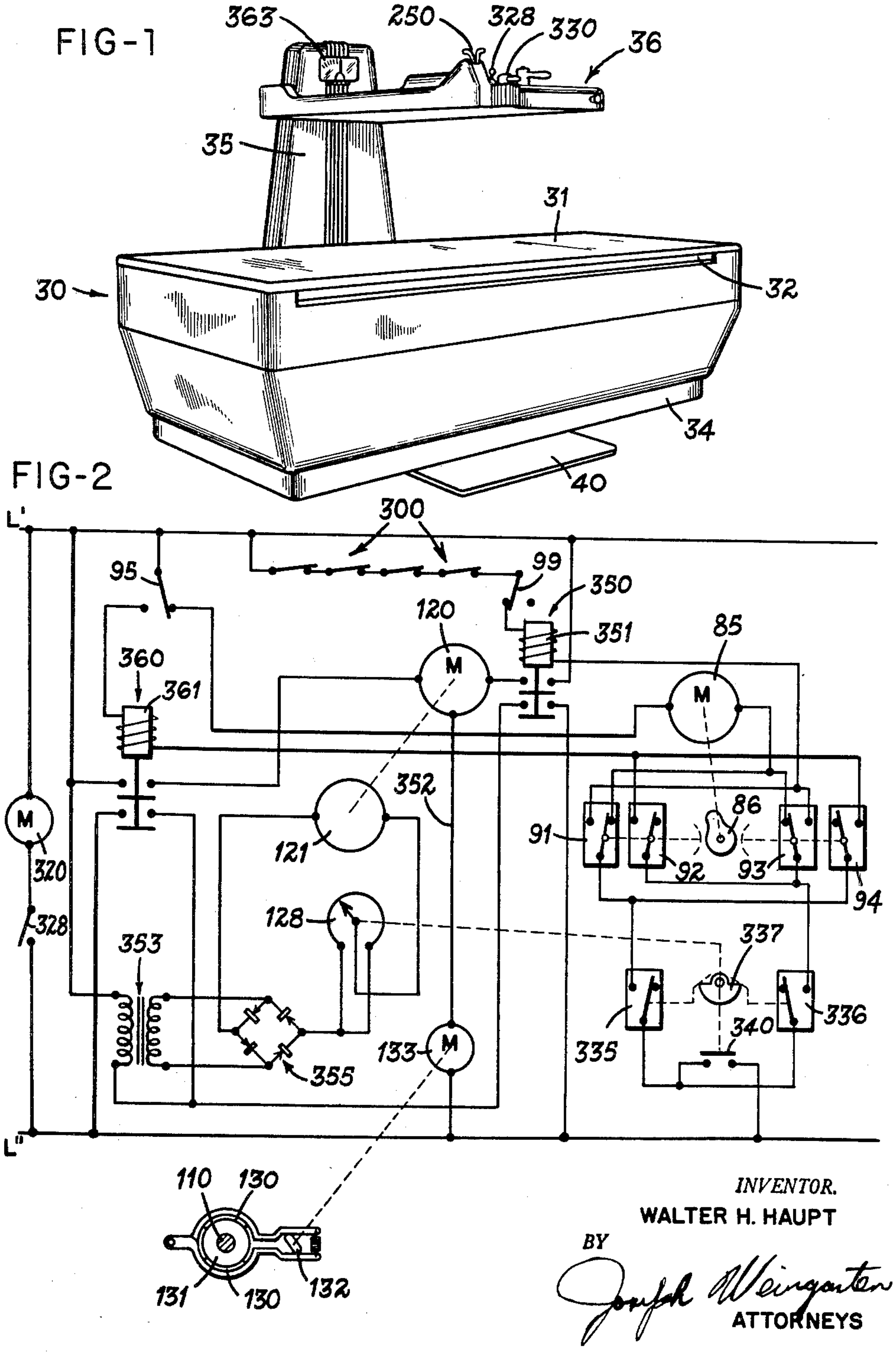
FIG. 1 is a perspective view illustrating generally the appearance of a two-way tilting X-ray table constructed in accordance with the invention.
FIG. 2 is a wiring diagram.

As shown in FIG. 2, when the table is tilted in either direction toward the vertical, the toggle linkage which straightens during the tilting, namely linkage 62—65 in FIG. 2, also acts as a brace resisting any tendency of the table to tilt forwardly, as it might otherwise do especially in positions near the vertical. The toggle arms and their pivots are therefore preferably of substantial size as shown to assure adequate such bracing and supporting action.

Additional stability for the table in its tilted positions is provided by a simple bracing and locking arrangement adjacent each of the pivot pins 60 and 70. A block or boss 105 is secured to the side of each arm 62 and 72 and carries a downwardly projecting pin 106 adapted to be received within a complementary sized bore in a shoulder or shelf 107 at each upper corner of the plate 42. As shown, when either of these pins is thus engaged with its cooperating shoulder, it effectively locks the associated pivot pin 60 or 70 against movement in a horizontal plane as well as against tilting or cocking.

The drive for tilting the table includes as its main part a screw jack, preferably of the ball bearing type, comprising a male part 110 and a female part 111 pivoted at its upper end within beam 50 by a pin 112 (FIG. 10) at the longitudinal center of the table. The lower end of jack part 110 is rotatably supported in a housing 115 mounted for rocking movement on an axis transverse of the table by pins 116 in ears 117 bolted to the base plate 44. Rotation of jack part 110 in either direction will accordingly result in a corresponding upward or downward force on the center of the table to effect tilting of the table about one or the other pivots 60 or 70.

The drive for jack 110—111 originates from a main drive motor 120 mounted on base plate 44 and which is indicated as including a magnetic clutch 121 (FIG. 2) through which it is connected by a belt drive connection 122 and a jack shaft 123 to a gear reduction 124 driving a sheave 125. Belt 126 connects sheave 125 with a sheave 127 on the lower end of jack part 110 and maintains the desired drive connection while permitting tilting of the jack with the table.

The provision of a magnetic clutch 121 facilitates variable speed control of the tilting movements of the table. As indicated in FIG. 2, clutch 12 may be variably energized through a suitable rheostat 128 to vary correspondingly the extent of slippage of the clutch and hence the torque transmitted to the shaft 123. Control over the entire speed range of tilting movements of the table is accordingly established through adjustment of rheostat 128. In order to hold jack part 110 stationary and thus to maintain the table in a desired tilted position, spring loaded brake shoes 130 are mounted on housing 115 for cooperation with a brake drum 131 on jack part 110, and they are arranged for release by a cam 132 driven by a small motor 133 such as a shaded pole motor mounted on housing 115 and having its control circuit suitably connected with the main drive motor 120 to release the brake only when the main drive motor is energized. Additional control over downward movement of the table is provided by a one-way friction clutch 135 suitably connected with the jack shaft 123 and the base to resist rotation of shaft 123 in the direction to cause downward movement of the table from a tilted position but to yield under the driving force of motor 120.

This table includes a novel counterweight mechanism for the tunnel which cooperates in such manner with the counterweights for the tower and tube carriage that the counterweight for the tunnel serves also as a part of the counterweight system for the entire tower and tube carriage structure without interference with free adjustment of the tower and tube carriage laterally of the table. Referring to FIGS. 10–18, the tower and tube carriage 56 includes a pair of hollow sections 140 and cross bars 141 and 142 mounted by suitable arrangements of rollers and tracks to move laterally of the table. The tower in turn includes a base part 145 carrying hollow sections 146 which straddle sections 140 and are mounted thereon laterally for movement of the table by means of rollers 147 and tracks 148. The carriage sections 145 carry at their forward ends the shutter unit indicated generally at 150 and the tube head 151, and the shutter unit is illustrated as of the construction shown in my co-pending application Serial No. 352,157, filed April 30, 1953, now Patent No. 2,722,611, and assigned to the same assignee as this application.

Figures 12, 13, 14, 15, 16, 17:
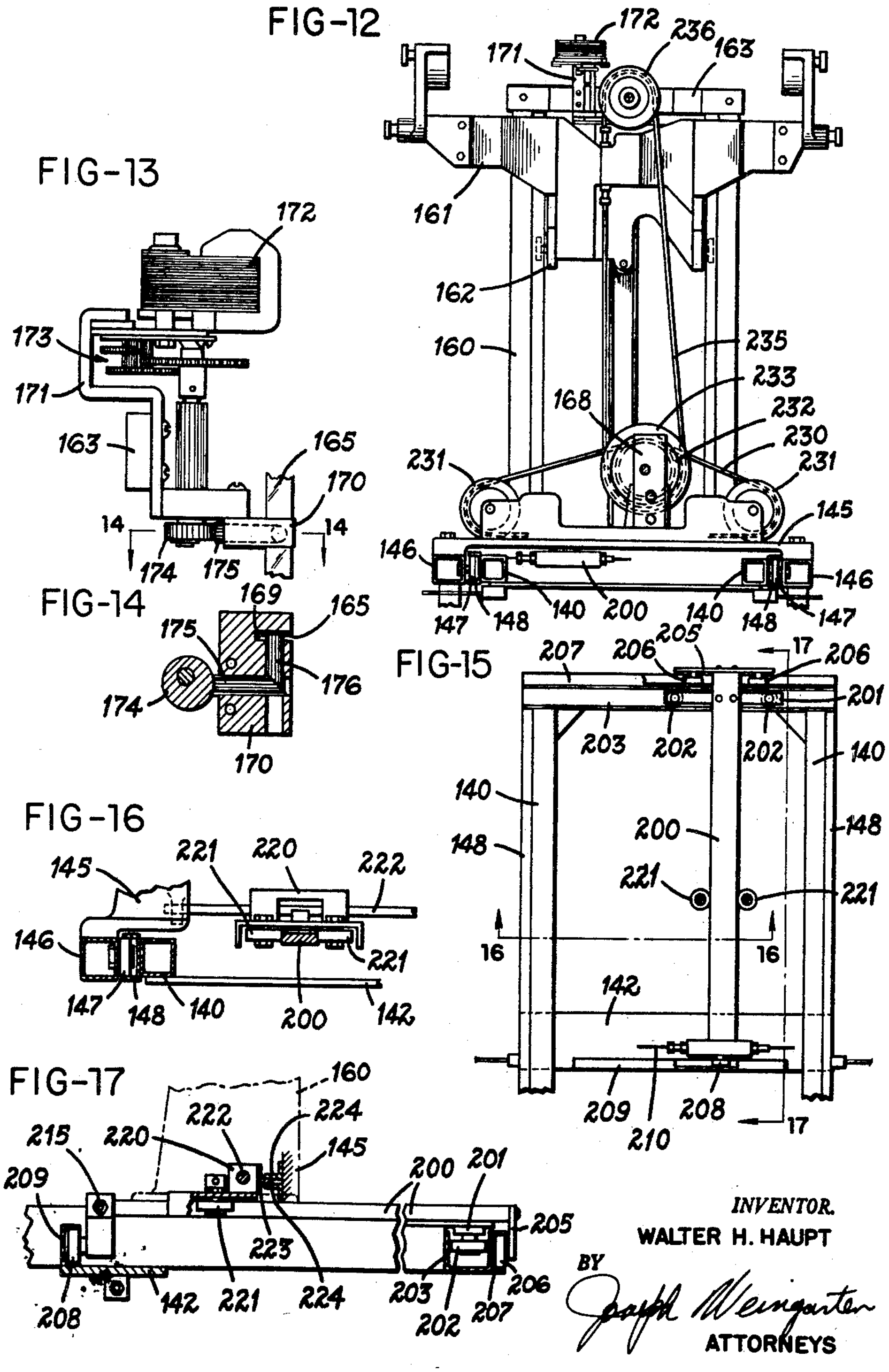
FIG. 12 is a fragmentary and somewhat diagrammatic view in front elevation showing the tower with its housing removed.
FIG. 13 is an enlarged fragmentary view looking from left to right in FIG. 12 and showing the motor-driven lock for the tunnel.
FIG. 14 is a detail section on the line 14—14 of FIG. 13.
FIG. 15 is a fragmentary plan view showing the mechanism connecting the tunnel support in the tower with the tunnel counterweight in the table.
FIG. 16 is an enlarged fragmentary section taken on the line 16—16 of FIG. 15.
FIG. 17 is an enlarged fragmentary section taken as indicated by the line 17—17 of FIG. 15.

The tower 35 is shown in FIG. 12 with its housing or cover removed. It includes a vertical frame 160 forming tracks for the supporting carriage 161 for the tunnel which is indicated as mounted for vertical movement on frame 160 by suitable rollers 162, and frame 160 includes a top cross bar 163. Locking of tunnel carriage 161 in any desired position of vertical adjustment is effected through a steel tape 165 running over a pulley 166 mounted on cross bar 163 and a second pulley 167 supported by a bracket 168 on the carriage base 145. The tape 165 runs through a slot 169 in a block 170 carried a bracket 171 mounted on the cross bar 163. The bracket 171 also supports a small electric motor 172 which operates through the gearing indicated generally at 173 to drive an eccentric cam 174 engaging a pin 175 slidable in the block 170. The pin 175 has a beveled inner end which engages the correspondingly beveled end of a second pin 176 slidable in the block 170 and projecting into the slot 169. When the motor 172 is energized to cause cam 174 to push pin 175, there will be a corresponding force on pin 176 causing it to lock the tape 165 frictionally against the opposite side of the slot 169. When motor 172 is deenergized, there is enough back slippage in the gearing 173 to permit the cam and pins to back off sufficiently to release tape 165.

The counterweight carriage 57 inside the table includes a generally rectangular frame 180 suspended at its upper end by rollers on the track 55 and guided at its lower end by rollers 181 in a channel 182 suspended by straps 183 from track 55 and provided with suitable brace rods 184 having their upper ends secured to the front of the table. The frame 180 carries one or more stationary weights 185 fixed thereto, and a movable weight 186 is mounted therein for movement normal to the top of the table, as by suitable rollers 187. The frame 180 also includes a central bracing bar 188.

The counterweight carriage 57 can accordingly move longitudinally of the table and is connected with the tower and tube carriage by means of a cable 190 which runs around pulleys 191 at opposite ends of the table and is secured at its opposite ends to the parts 140 and to the carriage frame 180 at 192 and 193 respectively. If desired for increased strength and safety, a plurality of these cables may be provided. The counterweight carriage 57 will accordingly move in the opposite direction from the tower and tube carriage to counterbalance the latter in tilted positions of the table. The bucky 33 is provided with its own similar counterweight 195 connected thereto by cables (not shown) and mounted by suitable rollers and tracks on the angle 51 and a cover member 196 at the front of the table.

The vertically movable counterweight 186 is selected to be of the proper weight to counterbalance tunnel 36 and its supporting carriage 161, and the weights 185 are similarly selected so that the total weight of the frame 180 and all of the parts mounted thereon will counterbalance the entire assembly of the tower, the tube carriage and the tunnel and its carriage. The weight 186 is accordingly mounted as described for vertical movement in frame 180, and it is provided with a flexible connection to the tower and tunnel such that it will move vertically in response to vertical movement of the tunnel on the tower but will not be affected by movements of the tower laterally of the table.

Referring to FIGS. 12–18, a bar 200 is mounted within the tube carriage for guided movement in accurately perpendicular relation with the length of the table so that it is at all times accurately parallel with the direction of movement of the tower laterally of the table. The bar 200 is generally T-shaped to provide an extension portion 201 at the back end of the tower, and this part 201 carries a pair of rollers 202 running in a channel track 203 connected to the rearward ends of the hollow sections 140. An additional extension 205 on the end of bar 200 carries rollers 206 running in a channel track 207 on the back of channel 203. At its forward end, the bar 200 carries an additional roller 208 running in a channel track 209 carried by the cross bar 142 of the tube carriage.

The bar 200 is connected at its forward end with the top of counterweight 186 by a cable 210 running around a pulley 211 at one end of the table and a pulley 212 on frame 180. To balance the system, a second cable 215 is connected to the bottom of weight 186 and runs around pulleys 216 and 217 on frame 180, a pulley 218 at the other end of the table and then to the opposite side of bar 200 from cable 210. Thus movements of bar 200 laterally of the tower will cause corresponding up and down movement of weight 186 in frame 180.

The bar 200 is also connected with the tunnel supporting carriage 161 by a connection which causes lateral movement of the bar in response to vertical movement of the tunnel while at the same time permitting the full range of movements of the tower laterally of the table without affecting the counterweight. A yoke, saddle or block 220 straddles bar 200 and is preferably provided with rollers or bearings 221 engaging the sides of this bar. The block 220 is slidable on a guide rod 222 secured at opposite ends to the tower base 145, and additional guiding of block 220 is effected by a projection 223 thereon sliding between a pair of angles 224 secured to the tower base.

Figures 18, 19:
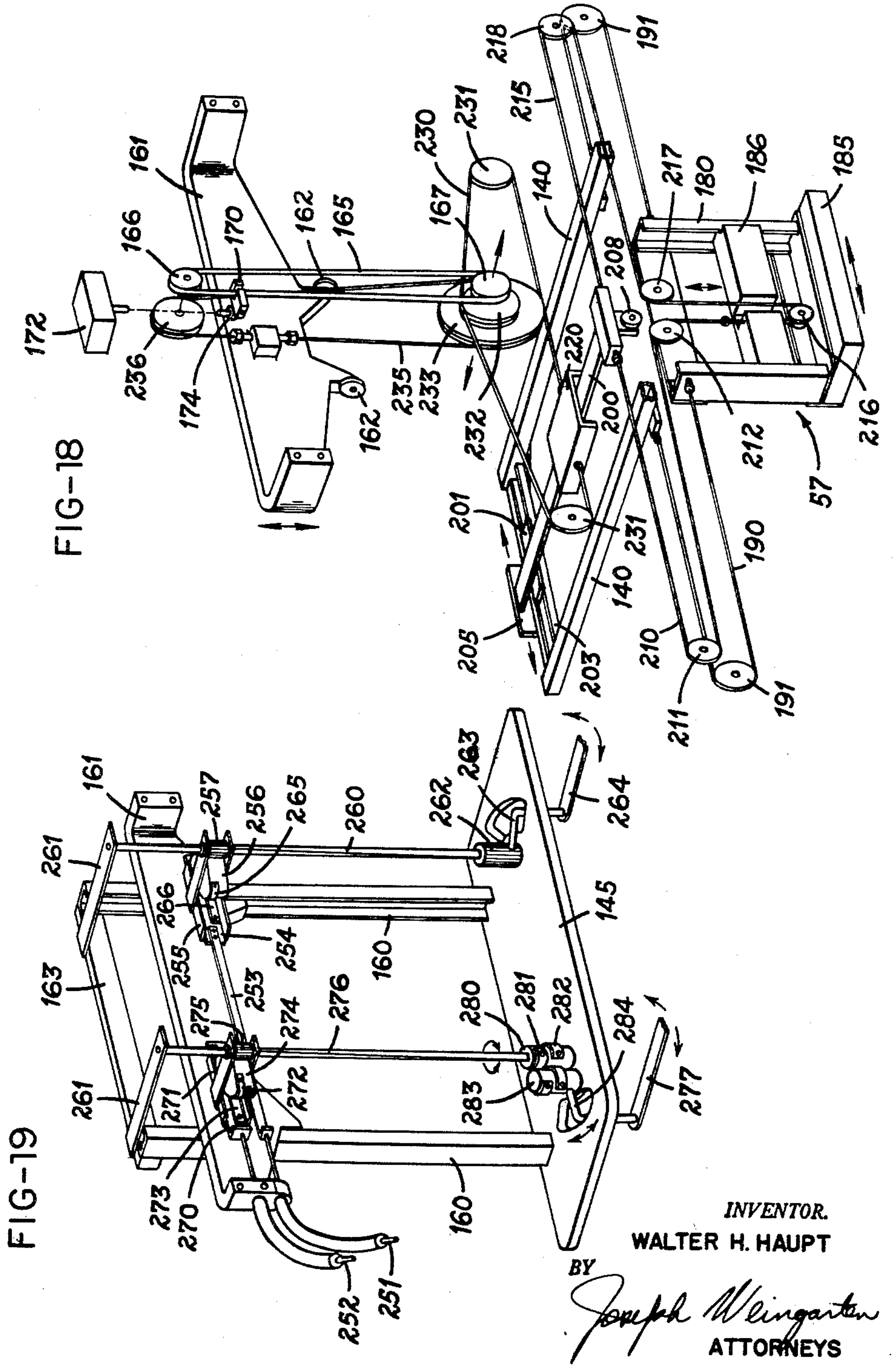
FIG. 18 is a diagrammatic view in the nature of a perspective illustrating the structure and operation of the counterweight system.
FIG. 19 is a fragmentary and diagrammatic perspective illustrating the operating mechanism for the tube shutters.

The block 220 is connected in such manner with the tunnel supporting carriage 161 that it moves laterally of the tube carriage in response to vertical movement of the tunnel. Referring to FIGS. 12 and 18, a cable 230 is connected at both ends to the block 220 and loops around a pair of pulleys 231 at opposite sides of the tower base 145 and also a pulley 232 which is mounted coaxially with the pulley 166 and an additional pulley 233 on the bracket 168. Another cable 235 is secured at both ends to the carriage 161, and it loops around the pulley 233 and a pulley 236 mounted at the top of the tower coaxially with the pulley 167, the pulleys 166 and 167 being removed in FIG. 12 for improved clarity of illustration.

With this arrangement, block 220 rides on bar 200 when the tower moves laterally of the table, but when the tunnel moves vertically, cable 230 will pull block 220 and thus cause corresponding movement of bar 200 which is transmitted to weight 186 by cables 210 and 215. When, however, the tube carriage moves lengthwise of the table, the counterweight 186 does not change its vertical position within frame 180 as the latter moves within the table, and cables 210 and 215 simply track around pulleys 211 and 218. The pulleys 232 and 233 are readily selected as required in the proper ratio to equalize the total range of vertical travel for the tunnel and the total range of travel of bar 200 across the tube carriage.

This counterweight system is not only fully as effective as the usual arrangement wherein the counterweight for the tunnel is located in the tower, but it offers substantial advantages from the standpoint of saving both deadweight and space within the table, with resulting reduction in the overall weight of the table and hence the load requirements of the frame and its entire supporting structure. Thus if the tunnel counterweight is in the tower, both must be compensated for in the counterweight unit within the table, so that if the tunnel and its carriage should weigh, for example, a total of 50 pounds, its counterweight must also weigh 50 pounds, and a total of 100 pounds must be added to the counterweight within the table, giving an overall total of 200 pounds for the tunnel and its counterweight system. With the system of the invention, a 50-pound tunnel and tunnel carriage requires only a 50-pound counterweight 186, and since this weight 186 also counterbalances the tunnel in tilted positions of the table, the total weight for the tunnel and its counterweight system is only 100 pounds, which is one-half the requirement for a conventional system while at the same time correspondingly reducing the space requirements for counterweights within the table.

FIG. 19 illustrates diagrammatically the mechanism in the tower for operating the shutters in the shutter assembly 150, and for the sake of clarity and simplicity, the parts shown in FIG. 19 are omitted from FIG. 12 and other views where they might otherwise appear. The shutter operating levers 250 (FIG. 1) on the tunnel 36 are connected by Bowden wires 251 and 252 with the tunnel 36 supporting carraige 161. The wire 251 is connected by a strap 253 with a slide 254 in a channel track 255 on carriage 161. The slide 254 is in turn operatively connected with a segment-shaped lever 256 having a hub 257 in the form of a bushing splined on a vertical shaft 260 mounted between the tower base 145 and a bracket 261 on the cross bar 163. At its lower end, the shaft 260 carries a hub 262 from which an arm 263 extends downwardly and is connected with one of the shutter operating levers 264.

The connection between the slide 254 and lever 256 is constructed to convert the sliding movement of the slide into rotational movement of the lever with substantially complete freedom from back lash. This connection is provided by a pair of flexible steel tapes 265 and 266 connected at their opposite ends respectively to the slide and the lever. Thus whenever the slide is moved, one of these tapes will wrap around the end of the lever while the other is unwrapping, providing a positive transmission of movement with no lost motion.

The other Bowden wire 252 is connected to a slide 270 in a track 271 on carriage 161, and the slide 270 is connected by tapes 272 and 273 with a lever 274 having its hub 275 splined on a shaft 276 mounted similarly to the shaft 260. In order to transmit the proper direction of motion from the shaft 276 to the other shutter operating lever 277, the shaft 276 carries a hub 280 at its lower end which is connected by a pair of flexible tapes 281 and 282 with a similar cylindrical hub member 283 rotatably mounted on the tower base 145, and the operating arm 284 for shutter lever 277 is carried by the hub 283. This double arrangement of pairs of steel tapes provides the same smooth and direct transmission of motion from the Bowden wire 252 to the shutter operating lever 277 without lost motion or back lash.

FIG. 19 also shows the shafts 260 and 276 as rectangular in section as well as twisted to form threads of low pitch, and the bushings 257 and 275 have similarly square bores. With this arrangement, a vertical movement of the tunnel carriage 161 will automatically adjust the shutter operating levers in accordance with the tunnel height to control the effective cross-section of the X-ray beam in such manner as to prevent overshooting of the tunnel and resulting possible injury to the operator.

The table includes an improved and simplified mechanism for guiding and supporting the cables for the X-ray tube head and other electrical parts in or on the table, and this mechanism is constructed and arranged to provide for full adjusting movements of the tube head with the minimum amount of cable and maximum simplicity within the table. Referring to FIGS. 10 and 20–23, the bottom pan 34 is provided at the front of the table with an elongated slot 280, and a guide member 281 having the form of an inverted flat funnel is secured within pan 34 with its larger end covering the slot 280. The electrical cables 282 are lead into the interior of the table through this slot and funnel, which are located at approximately the longitudinal center of the table. Above the funnel 281 is an additional supporting and guiding member for the cables in the form of an arm 285 pivoted by a bracket 286 to the angle 51, and the cables 282 are secured to this arm 285 by a plurality of supporting clips or clamps 287.

Figure 20:
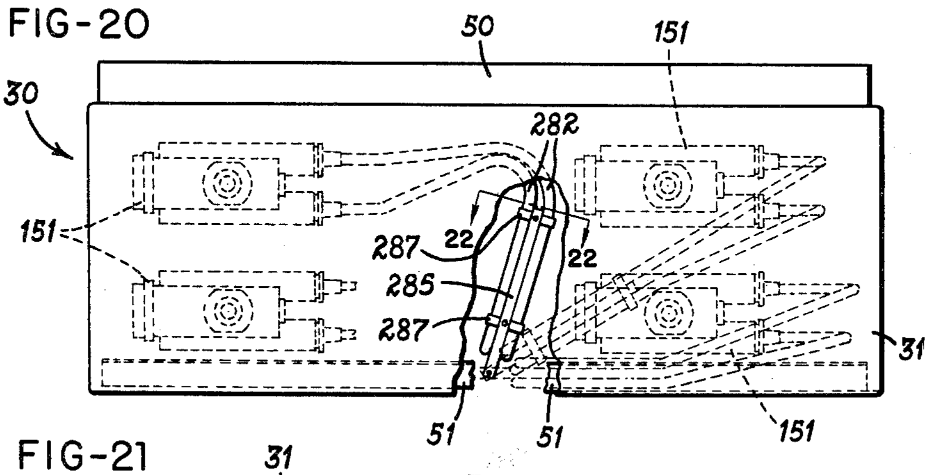
FIG. 20 is a diagrammatic top view illustrating the construction and operation of the cable support within the table.

FIG. 20 illustrates how this arrangement for supporting the cables 282 provides for the free adjusting movements of the tube head 151 without danger of kinking of the cables or possible interference by the cables in the path of the X-ray beam, four positions of the tube head being indicated in dotted lines. As shown in FIG. 20, the cables move with the swinging support 285 in such manner as always to be maintained away from the tube head without danger of kinking or contact with any of the other parts within the table, and since this arm is at the front of the table, it keeps the cables out of the way of the tower carriage and counterweights. In addition, this arrangement not only reduces to substantially a minimum the total amount of cable required for a given installation, but also it eliminates the necessity for maintaining a slack portion of the cable below or around the table such as might otherwise be necessary in order to prevent strain on the cable in both horizontal and tilted positions of the table.

Figures 21, 22, 23, 24:
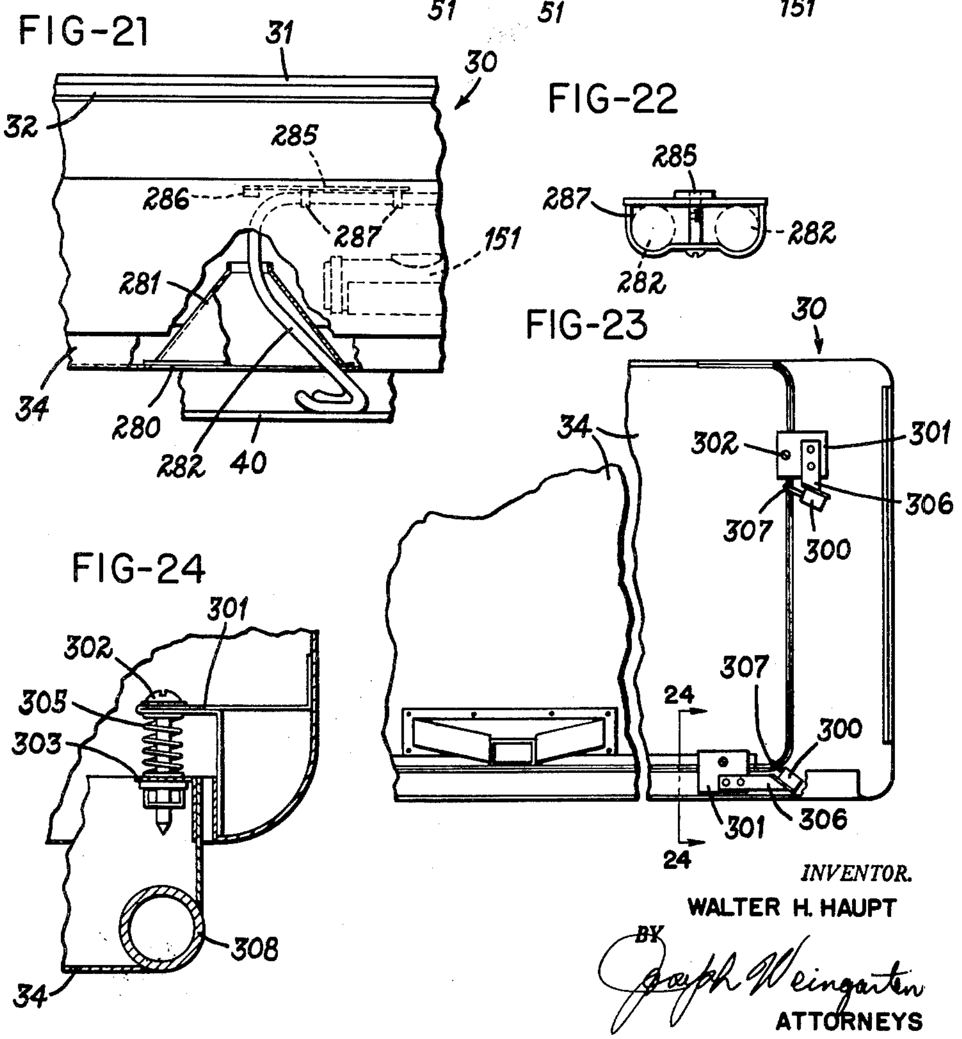
FIG. 21 is a fragmentary front elevational table, partly broken away and partly in section, further illustrating the cable support.
FIG. 22 is a detail section on the line 22—22 of FIG. 20.
FIG. 23 is a fragmentary top view further illustrating the cable supporting and guiding mechanism and also showing two of the limit switches in the bottom part of the cable.
FIG. 24 is a fragmentary section on the line 24—24 of FIG. 23.

FIGS. 23 and 24 illustrate an arrangement of safety switches for stopping tilting movement of the table in the event that any object should be lying in the path of the end of the table moving downwardly during tilting. For this purpose, the bottom pan 34 is separate from the remainder of the table shell and is resiliently supported by the shell in such manner as to operate one of a series of limit switches 300 to stop movement of the table upon contact by the pan 34 with any object in its downward path. FIG. 23 shows one end of the table, the other end being effectively identical, and as shown, the pan 34 is supported by a plurality of brackets 301 secured to the table shell. The pan 34 is effectively suspended from the table shell by means of a series of bolts 302 which connect each bracket 301 with a bracket or brace 303 on the pan 34, and each bolt 302 is provided with a compression spring 305 arranged to bias the pan downwardly.

Each of the brackets 301 also carries one of the limit switches 300, as by means of an extension bracket 306, with this arrangement being repeated at all four corners of the table. The operating arm 307 for each switch 300 extends above the top of pan 34 in such manner that if any corner of the pan should be raised against the springs 305, it will engage the adjacent switch arm 307 and open its associated switch. FIG. 34 also shows the pan 34 as including a reinforcing pipe 308 along its lower end for increased rigidity, and the pan accordingly acts as a feeler to sense the presence of any object in the path of the downwardly tilting end of the table and to cause the drive motor to be shut off before any damage can result.

Figures 25, 26, 27, 28:
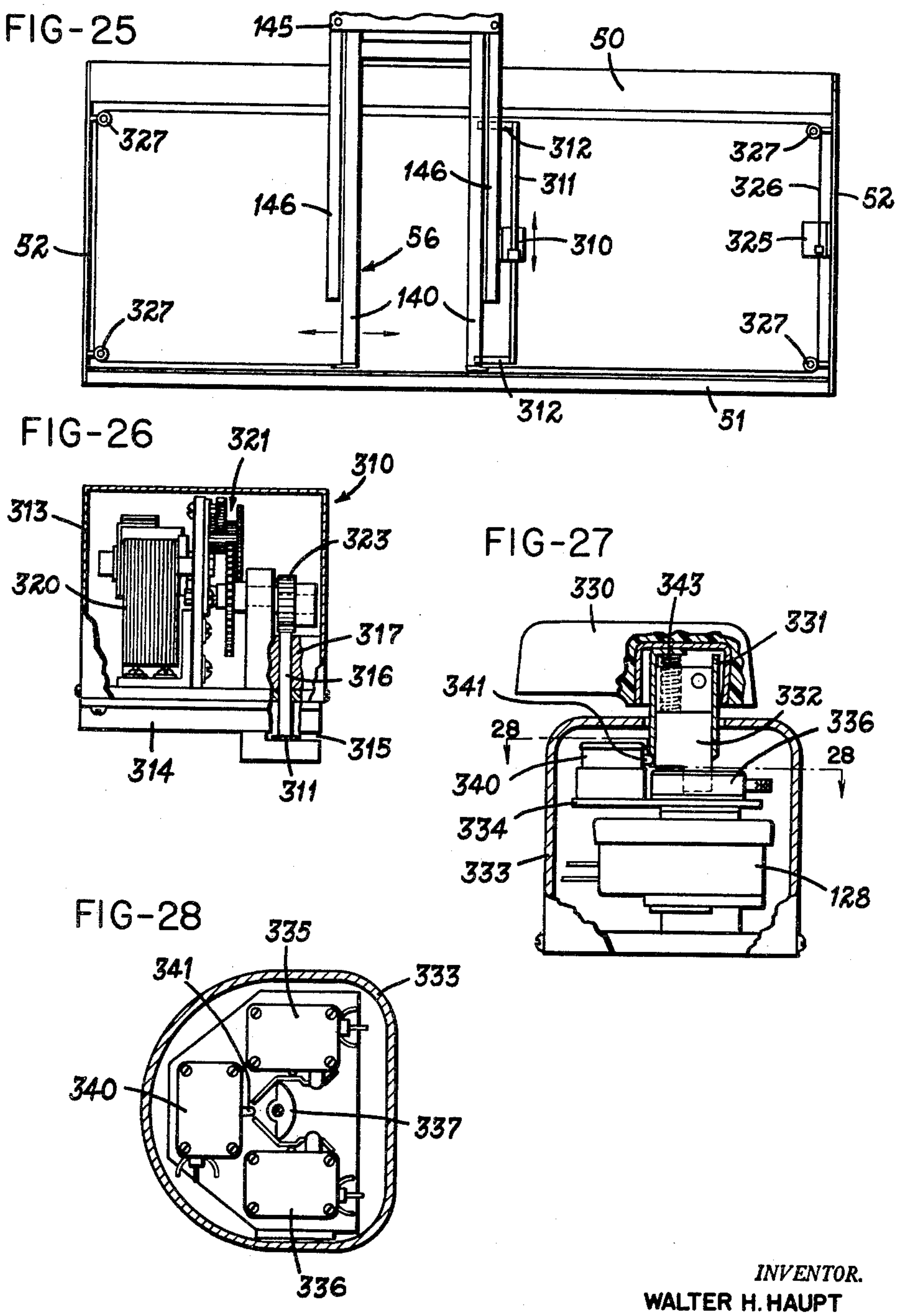
FIG. 25 is a diagrammatic top view illustrating the general arrangement and location of the lock mechanisms controlling lateral and longitudinal movements of the tube carriage.
FIG. 26 is a detail view showing one of the motor driven locks for the tube carriage and with parts broken away and in section.
FIG. 27 is a view partly in elevation and partly broken away in section showing the control handle for the table.
FIG. 28 is a section on the line 28—28 of FIG. 27.

FIGS. 25 and 26 illustrate the arrangement of motor operated locks for securing the tube carriage 56 in desired adjusted position laterally and longitudinally of the table. These lock units are generally similar to the lock already described for the vertical movements of the tunnel, and the lock 310 for lateral movements of the tube carriage is mounted on one of the hollow sections 146 of the tower structure and cooperates with a steel tape 311 supported by suitable brackets 312 secured to one of the hollow sections 140.

The lock 310 is shown in detail in FIG. 26, and it is shown as including a casing 313. The base 314 of the unit is provided wtih a slot 315 for receiving the tape 311 slidable therethrough, and a pin 316 is mounted for axial movement in a block 317 in casing 313 and projects into the slot 315. A motor 320 operates through the gear train 321 to drive an eccentric cam 323 engaging the inner end of pin 316. Thus when the motor 320 is energized, it will operate to cause cam 323 to force pin 317 into locking engagement with the tape 311, and when the motor is deenergized, the natural back slippage in the gear train will permit pin 317 to back off and free tape 311.

There is a similar lock arrangement for movements of the tube carriage longitudinally of the table, and it includes a lock assembly 325 which may be identical with the unit described in FIG. 26. The motor driven lock 325 cooperates with an elongated steel tape 326 which has both ends secured to the tube carriage 56 and runs around four pulleys 327 each positioned at one corner of the table. The lock 325 is secured in fixed position to the table frame, and thus when it is in locking position, it holds the tube carriage in the adjusted position longitudinally of the table.

The several motor driven locks as described are readily controlled by means of individual toggle switches or the like, and FIG. 2 indicates a suitable connection for one of these units in the control circuits for the table, with the motor 320 being indicated as provided with an On-Off control switch 328. It will be apparent that this arrangement may be duplicated for the motor 172 in the tunnel lock and also for the similar motor in the lock unit 325. The several switches for operating these locks may be readily grouped at a convenient control station such for example as on the tunnel 36, as indicated at 328 in FIG. 1.

FIGS. 27 and 28 show the main control unit for driving the table, this unit being indicated in FIG. 1 as carried by the tunnel 36. It includes a single control handle 330 mounted on a hollow shaft 331 which is in turn movable axially on the control shaft 332 for the rehostat 128, with all these parts being shown as housed by a suitable casing 333. On a plate 334 within the casing 333 are mounted two control switches 335 and 336 which are operable selectively by a cam 337 on shaft 332 to cause tilting movement of the table to the left and right respectively. An additional switch 340 is also mounted on the plate 334, and this switch serves as a safety cutoff switch and has its operating button 341 mounted for operation by the sleeve 331 when the handle 330 is depressed against the biasing spring 343 therewithin.

The wiring diagram in FIG. 2 illustrates the operation of the circuits for controlling tilting of the table, with the main power lines being identified as L′ and L″ respectively. If, for example, it is desired to cause the table to tilt from the horizontal to the right, the handle 330 must first be depressed in order to close the switch 340, and handle 330 is then turned in clockwise direction to close selector switch 336. Since the table is horizontal, the switch 95 will be in the position shown in FIG. 2, but FIG. 2 also shows switch 93 in such position that the first operation will be to complete the energizing circuit for motor 85 through switch 95 and thereby to drive the cam 86 until the hook 81 is fully latched. Latching of hook 81 will cause switches 93 and 94 to shift to their other positions from the position shown in FIG. 2, breaking the energizing circuit for motor 85 and instead completing the energizing circuit for relay 350, the energizing coil 351 for relay 350 being connected in series with the limit switch 99 and also the four limit switches 300 as described.

Closing of relay 350 completes an energizing circuit through its upper pair of contacts for the main drive motor 120, the other side of the motor being connected through the line 352 with the brake releasing motor 133 to cause the brake to be released simultaneously with energizing of the main motor. In addition, a circuit will be completed through the other pair of contacts in relay 350 to the primary of a transformer 353, the secondary of which is connected with a rectifier 355 for supplying direct current to the magnetic clutch 121. Power will accordingly be transmitted from drive motor 120 through clutch 121 to the screw jack 110—111, and the speed with which the jack is driven will depend upon the setting of the rheostat 128 as controlled by the handle 330.

Tilting of the table to the right will continue so long as the handle 330 is held in operating position or until the table reaches a vertical position. In the latter case, limit switch 99 will be opened as described in connection with FIG. 4, breaking the energizing circuits to relay 351 and causing the relay to open. Return movement of the table to the horizontal then requires shifting of control handle 330 in counterclockwise direction, opening switch 336 and then closing switch 335. The latter will complete a circuit through switch 94 to a second relay 360, the operating coil 361 of which is connected in series with the horizontal position limit switch 95. Closing of relay 360 completes a circuit through its upper pair of contacts to the motor 120 to energize the motor in the direction to reverse rotation of the screw jack, and similarly the transformer 353 will be energized through the lower pair of contacts 360 to energize clutch 121.

When the table again arrives at the horizontal, switch 95 will be shifted to its position shown in FIG. 2, thereby deenergizing relay 360. It the operator wishes the table to remain in this position, he has only to release control handle 330, but if the handle is held in operated position, the table begins to tilt in the opposite direction after a short pause. During this pause, motor 85 will again be energized, this time through switches 91 and 335, until it has shifted the hooks 80 and 81, releasing the latter and causing hook 80 to latch. Completion of this latching movement will automatically cut off motor 85 but at the same time it will energize relay coil 351 through switches 91 and 335 to reenergize motor 120 in the reverse direction, since whenever the table rises from the horizontal, such action requires operation of the jack in the opposite direction for movement of the table towards the horizontal. At the same time, the table can be stopped in any desired position by simply returning handle 330 to its released position, which will stop the main motor and also cause engagement of the brake 130, and FIG. 1 shows the tower as provided with an indicator 363 for showing the angle of tilt of the table in all its positions.

It will accordingly be seen that this overall table construction and control system provide multiple practical advantages in use. The mounting arrangement for the table leaves the entire front open for ready access, and the counterweight arrangement provides for substantial reduction in the requirements with respect to both weight and strength without in any way reducing the freedom of adjustment for the tube head. In particular, the control system for the table, including the motor driven locks for all adjusted parts, greatly facilitates the simplicity of control, since it makes it practical to locate all the control handles at a single convenient location. The single operating handle for controlling both the direction and speed of tilting of the table is especially advantageous, since it leaves one hand of the operator entirely free while providing sure and safe control of the table in all its positions.

While the form of apparatus herein described constitutes a preferred embodiment of the invention, it is to be understood that the invention is not limited to this precise form of apparatus, and that change may be made therein without departing from the scope of the invention which is defined in the appended claims.

What is claimed is:

1. In a tilting X-ray table including a tower and tube carriage movable laterally and longitudinally of said table and having a tunnel movable vertically thereon, a first counterweight movable longitudinally within said table in coordinated relation with the longitudinal movements of said carriage, a second counterweight carried by said first counterweight for vertical movement with respect thereto and for conjoint movement therewith longitudinally of said table, said second counterweight being correlated in weight with said tunnel, the total weight of said counterweights being correlated with the total weight of said carriage and all parts carried thereby, means for effecting movement of said carriage laterally of said table without movement of said counterweights, means for causing vertical movement of said second counterweight with respect to said first counterweight in response to vertical movement of said tunnel on said tower, and means for causing conjoint movement of said counterweights and said carriage longitudinally of said table.

2. In a tilting X-ray table including a tower and tube carriage movable laterally and longitudinally of said table and having a tunnel movable vertically thereon, a first counterweight movable longitudinally within said table in coordinated relation with the longitudinal movements of said carriage, a second counterweight carried by said first counterweight for vertical movement with respect thereto and for conjoint movement therewith longitudinally of said table, said second counterweight being correlated in weight with said tunnel, the total weight of said counterweights being correlated with the total weight of said carriage and all parts carried thereby, a bar mounted for movement on said carriage longitudinally of said table, means connecting said bar with said second counterweight to cause movement thereof in response to movement of said bar with respect to said carriage, a follower mounted for free movement longitudinally of said bar, and means connecting said follower with said tunnel for movement with respect to said carriage longitudinally of said table in response to vertical movement of said tunnel to cause corresponding movement of said bar longitudinally of said table and resulting vertical movement of said second counterweight.

3. In an X-ray table including a tower and tube carriage movable laterally and longitudinally of said table and having a tunnel mounted thereon for movement above the table in line with the tube head carried by said carriage within the table, shutter means carried by said carriage for cooperation with said tube head, pivotally mounted control members for said shutter means mounted on said carriage, operating members for said shutter control means mounted for sliding movement in said tower, a lever mounted coaxially with each of said shutter control members and adjacent said sliding members, a pair of flexible tapes associated with each said sliding member and lever, and means connecting the ends of each pair of said tapes in alternating relation to the associated said lever and sliding member to transfer the sliding movement of said sliding member into rotational movement of said levers with substantially complete freedom from back lash.

4. In an X-ray table including a carriage supported for movement with respect to another part of said table, locking means for securing said carriage in stationary relation to said other part comprising a flexible tape and a block carried one by said carriage and the other by said other part, said block having a slot therethrough for freely receiving said tape therein, a pin movable axially in said block into the interior of said slot to lock said tape frictionally therein, a cam for urging said pin into said locking engagement with said table, and a motor and gear train for driving said cam, said gear train being constructed and arranged to provide sufficient back slippage for release of said pin from said locking position thereof upon deenergizing of said motor.

5. In combination with an X-ray table, a tower and tube carriage, means mounting said carriage for horizontal movement laterally and longitudinally of said table, a tower carried by said carriage, a tunnel, means mounting said tunnel for vertical movement on said tower, a first counterweight movable horizontally within said table in coordinated relation with selected horizontal movement of said carriage, a second counterweight, means supporting said second counterweight for vertical movement relative to said carriage and for horizontal movement coordinated with said selected horizontal movement of said carriage, means for effecting horizontal movement of said carriage normal to said selected horizontal movement without movement of said counterweights, means for effecting vertical movement of said second counterweight relative to said carriage in response to vertical movement of said tunnel on said tower, and means for effecting horizontal movement of said counterweights coordinately with said selected horizontal carriage movement.

References Cited in the file of this patent

UNITED STATES PATENTS

| | | |
|---|---|---|
| 1,617,028 | Pekar | Feb. 8, 1927 |
| 2,504,687 | Hollstein | Apr. 18, 1950 |
| 2,526,879 | Kizaur | Oct. 24, 1950 |
| 2,552,858 | Mueller et al. | May 15, 1951 |
| 2,712,080 | Koerner et al. | June 28, 1955 |
| 2,722,611 | Haupt | Nov. 1, 1955 |